United States Patent
Wei et al.

(10) Patent No.: US 9,930,675 B2
(45) Date of Patent: Mar. 27, 2018

(54) POLICY CONTROL METHOD, AND DEVICE (71) Applicant: Huawei Technologies Co., Ltd., Shenzhen (CN)

(72) Inventors: Anni Wei, Beijing (CN); Lei Zhu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 114 days.

(21) Appl. No.: 14/602,931

(22) Filed: Jan. 22, 2015

(65) Prior Publication Data
US 2015/0138982 A1 May 21, 2015

Related U.S. Application Data (63) Continuation of application No. PCT/CN2013/075109, filed on May 3, 2013.

(30) Foreign Application Priority Data

Jul. 24, 2012 (CN) .......................... 2012 1 0257718

(51) Int. Cl.
*H04W 72/04* (2009.01)
*H04L 29/08* (2006.01)
(Continued)

(52) U.S. Cl.
CPC ....... *H04W 72/0493* (2013.01); *H04L 65/608* (2013.01); *H04L 65/80* (2013.01);
(Continued)

(58) Field of Classification Search
CPC .......... H04W 72/0493; H04W 28/0289; H04L 65/608; H04L 65/80
See application file for complete search history.

(56) References Cited

U.S. PATENT DOCUMENTS 6,415,313 B1 * 7/2002 Yamada ............... H04L 45/54
370/332
9,325,587 B2 * 4/2016 Groenendijk
(Continued)

FOREIGN PATENT DOCUMENTS

CN 102014446 A 4/2011
CN 102404780 A 4/2012
(Continued)

OTHER PUBLICATIONS

"3rd Generation Partnership Project; Technical Specification Group Services and System Aspects; Transparent end-to-end Packet-Switched Streaming Service (PSS); Protocols and Codecs (Release 11)," 3 GPP TS 26.234, V11.0.0, Mar. 2012, 169 pages.
(Continued)

*Primary Examiner* — Hashim Bhatti
(74) *Attorney, Agent, or Firm* — Slater Matsil, LLP (57) ABSTRACT

Embodiments of the present invention provide a policy control method and a device. The method includes: receiving a quality of experience QoE report sent by a user equipment UE, where the QoE report includes a QoE metric and a cell identity of a serving cell of the UE; and performing cell policy control according to the QoE report. In the embodiments of the present invention, a QoE server receives a QoE report sent by a UE, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

20 Claims, 6 Drawing Sheets

(51) Int. Cl.
  *H04L 29/06*   (2006.01)
  *H04W 28/02*   (2009.01)
  *H04W 72/08*   (2009.01)
  *H04N 21/643*  (2011.01)

(52) U.S. Cl.
  CPC ....... *H04L 67/322* (2013.01); *H04W 28/0289* (2013.01); *H04W 72/087* (2013.01); *H04N 21/64322* (2013.01)

(56) References Cited

U.S. PATENT DOCUMENTS

| | | | |
|---|---|---|---|
| 2002/0019231 A1* | 2/2002 | Palenius | H04W 36/0083 |
| | | | 455/437 |
| 2007/0025301 A1* | 2/2007 | Petersson | H04L 47/10 |
| | | | 370/338 |
| 2009/0270102 A1* | 10/2009 | Liu | H04W 36/36 |
| | | | 455/436 |
| 2010/0029266 A1* | 2/2010 | van Gassel | H04L 41/5009 |
| | | | 455/424 |
| 2010/0232340 A1 | 9/2010 | Godor et al. | |
| 2010/0248643 A1* | 9/2010 | Aaron | H04L 1/0002 |
| | | | 455/68 |
| 2010/0316066 A1 | 12/2010 | Leung | |
| 2011/0201364 A1* | 8/2011 | Capuozzo | H04W 24/10 |
| | | | 455/466 |
| 2011/0244852 A1* | 10/2011 | Quadri | H04W 24/04 |
| | | | 455/423 |
| 2012/0149431 A1 | 6/2012 | Bakker et al. | |
| 2012/0151009 A1* | 6/2012 | Bouazizi | H04L 41/5067 |
| | | | 709/219 |
| 2013/0040683 A1* | 2/2013 | Siomina | H04W 28/0236 |
| | | | 455/517 |
| 2014/0004863 A1* | 1/2014 | Zhang | H04W 36/0033 |
| | | | 455/444 |
| 2014/0119196 A1* | 5/2014 | Hui | H04W 24/10 |
| | | | 370/241 |
| 2014/0334309 A1* | 11/2014 | Mihaly | H04L 47/2441 |
| | | | 370/235 |

FOREIGN PATENT DOCUMENTS

| | | |
|---|---|---|
| CN | 102469557 A | 5/2012 |
| CN | 102474747 A | 5/2012 |
| CN | 102523291 A | 6/2012 |
| CN | 102802089 A | 11/2012 |
| EP | 2154647 A1 | 2/2010 |
| EP | 2472946 A1 | 7/2012 |
| EP | 2615863 A1 | 7/2013 |

OTHER PUBLICATIONS

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10)," 3GPP TS 26.247 V10.2.0, Jun. 2012, 110 pages.

Fielding, R. et al., "Hypertext Transfer Protocol—HTTP/1.1" RFC 2616, Network Working Group, Standards Track, Jun. 1999, 187 pages.

3rd Generation Partnership Project; Technical Specification Group Services and System Aspects; Multimedia Broadcast/Multicast Service (MBMS); Protocols and codecs (Release 9), 3GPP TS 26.346 V9.7.0, Jun. 2012, 166 pages.

"QoE Correlation to Network Resource," Draft Change Request, 26.346 CR 00xx, Current Version, 9.x, 3GPP TSG-SA4, Meeting No. 52, S4-090083, Telefon AB LM Ericsson, Paris, France, Jan. 26-30, 2009, 6 pages.

* cited by examiner

POLICY CONTROL METHOD, AND DEVICE

This application claims the benefit of International Application No. PCT/CN2013/075109, filed on May 3, 2013, which application claims priority to Chinese Patent Application No. 201210257718.X, filed Jul. 24, 2012 both of which applications are incorporated herein by reference.

TECHNICAL FIELD

Embodiments of the present invention relate to the field of communications technologies, and in particular, to a policy control method and a device.

BACKGROUND

In network application, QoE (Quality of Experience, quality of experience) describes a subjective feeling of a user for service performance provided by a network, such as satisfaction regarding such aspects as availability, accessibility, and service integrity. The QoE is related to a specific service. For example, some services are sensitive to a delay, while some services are relatively sensitive to a packet loss rate. In addition, the QoE is further affected by factors, such as QoS (Quality of Service, quality of service), service provisioning, and a support level of a network. The QoE can be divided into five levels, including: excellent, very good, good, fair, and poor, to indicate experience and feeling of a user for a service and a network and reflect a gap between current quality of the service and the network and user expectations.

A QoE metric defined in 3GPP (The 3rd Generation Partnership Project, The 3rd Generation Partnership Project) is used as an example, where a QoE metric supported by a progressive download client includes an average throughput, a buffer level, a playlist, an initial playback delay, an HTTP (Hypertext Transport Protocol, Hypertext Transport Protocol) request/response interaction list, or the like. For another example, a QoE metric supported by a client of Dynamic Adaptive Streaming over HTTP includes an average throughput, a buffer level, a playlist, an initial playback delay, a media presentation handover implementation list, MPD information, an HTTP request/response interaction list, or the like.

In the prior art, a client reports a QoE report to a QoE server. Content of the QoE report is divided into two types: the foregoing QoE metric that is unrelated to a transmission mode and does not directly reflect a bottom link status, for example, a delay; and a QoE metric that is collected at a physical layer and reflects channel transmission quality, for example, signal strength. However, after the client reports the QoE report, there are some application limitations due to sufficient information. Therefore, an effect of greatly enhancing user experience cannot be achieved.

SUMMARY

Embodiments of the present invention provide a policy control method and a device, which can effectively enhance user experience.

According to a first aspect, a policy control method is provided and includes: receiving a quality of experience QoE report sent by a user equipment UE, where the QoE report includes a QoE metric and a cell identity of a serving cell of the UE; and performing cell policy control according to the QoE report.

In a first possible implementation manner, specific implementation of the performing cell policy control according to the QoE report may be:

determining a resource control policy for the serving cell according to the QoE report.

According to the first possible implementation manner, in a second possible implementation manner, after the determining a resource control policy for the serving cell according to the QoE report, specific implementation may be:

sending a first resource adjustment request message to the UE according to the resource control policy, so that the UE correspondingly increases or decreases a bit rate according to the first resource adjustment request message; or performing a resource allocation adjustment according to the resource control policy; or sending a second resource adjustment request message to a radio access network RAN according to the resource control policy, so that the RAN performs a resource allocation adjustment according to the second resource adjustment request message.

According to the second possible implementation manner, in a third possible implementation manner, specific implementation may be:

the second resource adjustment request message carries a service flow identifier, so that the RAN performs a resource allocation adjustment to a corresponding service according to the second resource adjustment request message.

With reference to the first aspect, in a fourth possible implementation manner, specific implementation of the performing cell policy control according to the QoE report may be:

determining a hotspot cell according to the QoE report, and determining a cell policy for the hotspot cell.

According to the fourth possible implementation manner, in a fifth possible implementation manner, specific implementation may be:

the cell policy for the hotspot cell includes a multipoint transmission policy of the hotspot cell.

With reference to the first aspect, in a sixth possible implementation manner, specific implementation of the performing cell policy control according to the QoE report may be:

determining a service fault cell according to the QoE report, and determining a cell policy for the service fault cell.

According to the sixth possible implementation manner, in a seventh possible implementation manner, specific implementation may be:

the cell policy for the service fault cell includes a service recovery policy of the service fault cell.

With reference to the first aspect, in an eighth possible implementation manner, specific implementation of the performing cell policy control according to the QoE report may be:

determining a congested cell according to the QoE report, and determining a cell policy for the congested cell.

According to the eighth possible implementation manner, in a ninth possible implementation manner, specific implementation may be:

the cell policy for the congested cell includes a cell handover policy of the congested cell.

According to a second aspect, a policy control method is provided and includes: determining a quality of experience QoE report; and sending the QoE report to a QoE server, where the QoE report includes a QoE metric and a cell identity of a serving cell of a user equipment UE, so that the QoE server performs cell policy control according to the QoE report.

With reference to the second aspect, in a first possible implementation manner, specific implementation of the performing, by the QoE server, cell policy control according to the QoE report may be:

determining, by the QoE server, a resource control policy for the serving cell according to the QoE report.

According to the first possible implementation manner, in a second possible implementation manner, specific implementation may be:

receiving a first resource adjustment request message that is sent according to the resource control policy by the QoE server; and increasing or decreasing a bit rate correspondingly according to the first resource adjustment request message.

According to a third aspect, a quality of experience QoE server is provided and includes:

a receiving unit, configured to receive a quality of experience QoE report sent by a user equipment UE, where the QoE report includes a QoE metric and a cell identity of a serving cell of the UE; and a control unit, configured to perform cell policy control according to the QoE report received by the receiving unit.

With reference to the third aspect, in a first possible implementation manner, the control unit is specifically configured to:

determine a resource control policy for the serving cell according to the QoE report.

According to the first possible implementation manner, in a second possible implementation manner, the QoE server further includes:

a first sending unit, configured to send a first resource adjustment request message to the UE according to the resource control policy, so that the UE correspondingly increases or decreases a bit rate according to the first resource adjustment request message; or the control unit is further configured to perform a resource allocation adjustment according to the resource control policy; or the QoE server further includes: a second sending unit, configured to send a second resource adjustment request message to a radio access network RAN according to the resource control policy, so that the RAN performs a resource allocation adjustment according to the second resource adjustment request message.

According to the second possible implementation manner, in a third possible implementation manner, the second resource adjustment request message carries a service flow identifier, so that the RAN performs a resource allocation adjustment to a corresponding service according to the second resource adjustment request message.

With reference to the third aspect, in a fourth possible implementation manner, the control unit is specifically configured to:

determine a hotspot cell according to the QoE report, and determine a cell policy for the hotspot cell.

With reference to the third aspect, in a fifth possible implementation manner, the control unit is specifically configured to:

determine a service fault cell according to the QoE report, and determine a cell policy for the service fault cell.

With reference to the third aspect, in a sixth possible implementation manner, the control unit is specifically configured to:

determine a congested cell according to the QoE report, and determine a cell policy for the congested cell.

According to a fourth aspect, a user equipment is provided and includes: a determining unit, configured to determine a quality of experience QoE report; and a sending unit, configured to send the QoE report, which is determined by the determining unit, to a QoE server, where the QoE report includes a QoE metric and a cell identity of a serving cell of the user equipment UE, so that the QoE server performs cell policy control according to the QoE report.

With reference to the fourth aspect, in a first possible implementation manner, the user equipment further includes:

a receiving unit, configured to receive a first resource adjustment request message that is sent according to a resource control policy by the QoE server, where the determining unit is further configured to correspondingly increase or decrease a bit rate according to the first resource adjustment request message.

In the embodiments of the present invention, a QoE server receives a QoE report sent by a UE, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM, Global System for Mobile communications) system, a Code Division Multiple Access (CDMA, Code Division Multiple Access) system, a Wideband Code Division Multiple Access (WCDMA, Wideband Code Division Multiple Access) system, a general packet radio service (GPRS, General Packet Radio Service) system, and a Long Term Evolution (LTE, Long Term Evolution) system.

A user equipment (UE, User Equipment), also referred to as a mobile station (Mobile Station), a mobile user equipment, and the like, may communicate with one or more core networks through a radio access network (for example, RAN, Radio Access Network). The user equipment may be a mobile station, such as a mobile phone (also referred to as a "cellular" phone) and a computer with a mobile station. For example, the user equipment may be a portable, pocket-sized, handheld, computer built-in, or in-vehicle mobile apparatus, which exchanges voice and/or data with the radio access network.

A base station may be a base transceiver station (BTS, Base Transceiver Station) in the GSM or CDMA, may also be a NodeB (NodeB) in the WCDMA, or may further be an evolved NodeB (eNB or e-NodeB, evolved Node B) in the LTE, which is not limited in the present invention.

Figure 1:
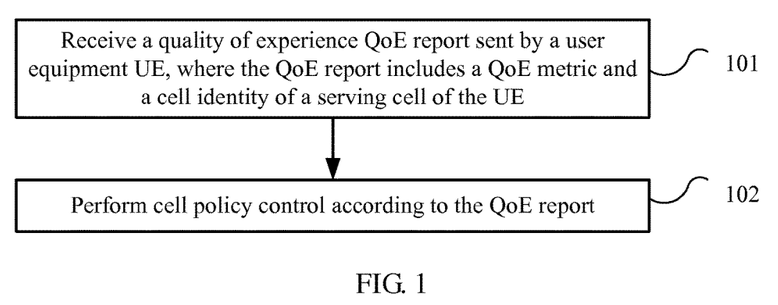
FIG. 1 is a flowchart of a policy control method according to an embodiment of the present invention.

FIG. 1 is a flowchart of a policy control method according to an embodiment of the present invention. The method in FIG. 1 is executed by a QoE server.

101. Receive a quality of experience QoE report sent by a user equipment UE, where the QoE report includes a QoE metric and a cell identity of a serving cell of the UE.

102. Perform cell policy control according to the QoE report.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the QoE server may determine a resource control policy for the serving cell according to the QoE report. In this way, network resources can be effectively adjusted, thereby improving network resource utilization.

Further, the QoE server may send a first resource adjustment request message to the UE according to the resource control policy, so that the UE correspondingly increases or decreases a bit rate according to the first resource adjustment request message; or the QoE server may perform a resource allocation adjustment according to the resource control policy; or the QoE server may send a second resource adjustment request message to a RAN (Radio Access Network, radio access network) according to the resource control policy, so that the RAN performs a resource allocation adjustment according to the second resource adjustment request message; or the like. Further, the second resource adjustment request message may carry a service flow identifier, so that the RAN may perform a resource allocation adjustment to a corresponding service according to the second resource adjustment request message that carries the service flow identifier. It should be understood that, this is not construed as a limitation on this embodiment of the present invention, that is, any manner in which the QoE server performs a resource control policy shall fall within the scope of the present invention. With reference to specific embodiments, the following further describes a nonrestrictive example of a transmission method in this embodiment of the present invention in more detail.

Optionally, in another embodiment, the QoE server may determine a hotspot cell according to the QoE report, and determine a cell policy for the hotspot cell. Specifically, the cell policy for the hotspot cell may be a multipoint transmission policy of the hotspot cell. In this way, service offloading can be implemented in the hotspot cell, so that a network throughput increases, thereby enhancing user experience. For example, an operator may perform a network analysis according to QoE reports of UEs. If it is learned from QoE reports read by a QoE server that cell identities reported by most UEs that are performing a same service are A, a cell A may be considered as a hotspot cell of the service. A policy for the hotspot cell, for example, network planning and network optimization may be implemented according to the foregoing.

Optionally, in another embodiment, the QoE server may determine a congested cell according to the QoE report, and determine a cell policy for the congested cell. In this way, it can be ensured that a user service of the congested cell is not interrupted, thereby enhancing user experience. For example, the QoE server may determine a congested cell according to a cell identity and a QoE metric in the QoE report, such as a transmission delay, so that load control can be performed, and some users are handed over from the congested cell to another neighboring cell.

Optionally, in another embodiment, the QoE server may further determine a service fault cell according to the QoE report, and determine a cell policy for the service fault cell. Specifically, the cell policy for the service fault cell may be a service recovery policy of the service fault cell. In this way, a problem of a service fault can be solved promptly, thereby enhancing user experience. For example, the QoE server may comprehensively analyze QoE reports reported by multiple UEs, so as to determine that cells or a cell having an abnormally low service volume or no service volume are or is service fault cells or a service fault cell.

It should be understood that this embodiment of the present invention sets no limitation on a policy form that is determined according to the QoE report by the QoE server.

In this embodiment of the present invention, a QoE server receives a QoE report sent by a UE, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

Figure 2:
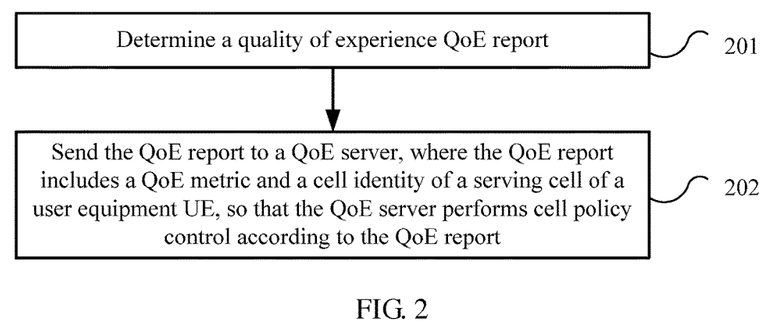
FIG. 2 is a flowchart of a policy control method according to another embodiment of the present invention.

FIG. 2 is a flowchart of a policy control method according to another embodiment of the present invention. The method in FIG. 2 is executed by a UE and is corresponding to the method in FIG. 1. Therefore, a description that has been provided in the embodiment shown in FIG. 1 is appropriately omitted.

201. Determine a quality of experience QoE report.

202. Send the QoE report to a QoE server, where the QoE report includes a QoE metric and a cell identity of a serving cell of a user equipment UE, so that the QoE server performs cell policy control according to the QoE report.

In this embodiment of the present invention, a UE sends a QoE report to a QoE server, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the QoE server may determine a resource control policy for the serving cell according to the QoE report. Further, the UE receives a first resource adjustment request message that is sent according to the resource control policy by the QoE server. The UE correspondingly increases or decreases a bit rate according to the first resource adjustment request message. In this way, network resources can be effectively adjusted, thereby improving network resource utilization.

Optionally, in another embodiment, the QoE server may determine a hotspot cell according to the QoE report, and determine a cell policy for the hotspot cell. For example, the cell policy for the hotspot cell may be a multipoint transmission policy of the hotspot cell. In this way, service offloading can be implemented in the hotspot cell, so that a network throughput increases, thereby enhancing user experience. Alternatively, the QoE server may further determine a service fault cell according to the QoE report, and determine a cell policy for the service fault cell. For example, the cell policy for the service fault cell may be a service recovery policy of the service fault cell. In this way, a problem of a service fault can be solved promptly, thereby enhancing user experience.

It should be understood that this embodiment of the present invention sets no limitation on a policy form that is determined according to the QoE report by the QoE server.

Figure 3:
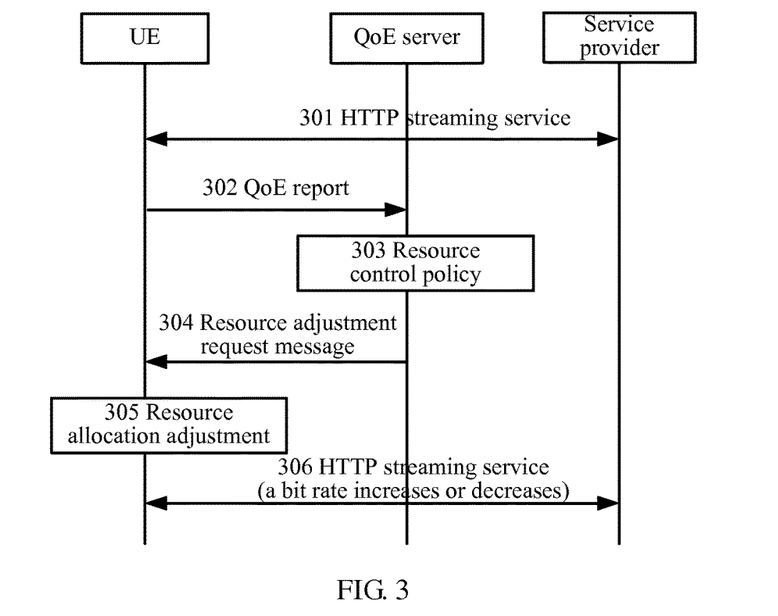
FIG. 3 is a schematic flowchart of a process of a policy control method according to an embodiment of the present invention.
Figure 4:
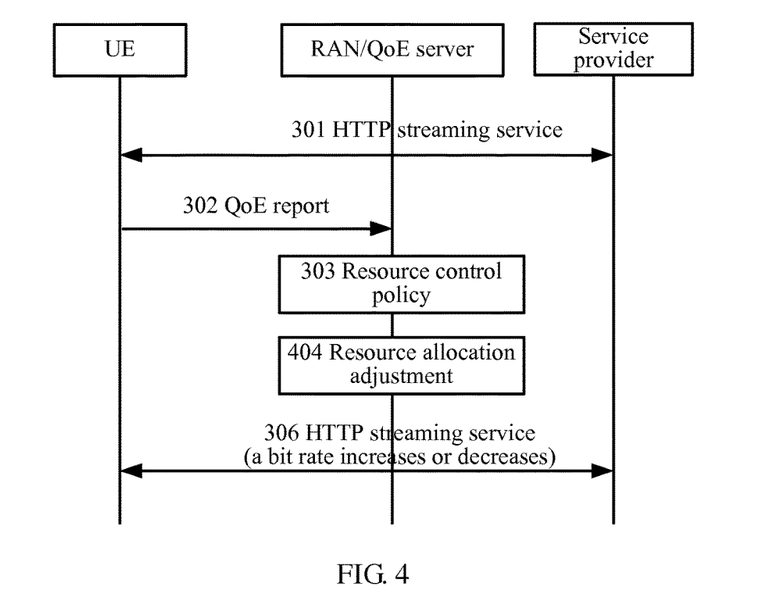
FIG. 4 is a schematic flowchart of a process of a policy control method according to another embodiment of the present invention.
Figure 5:
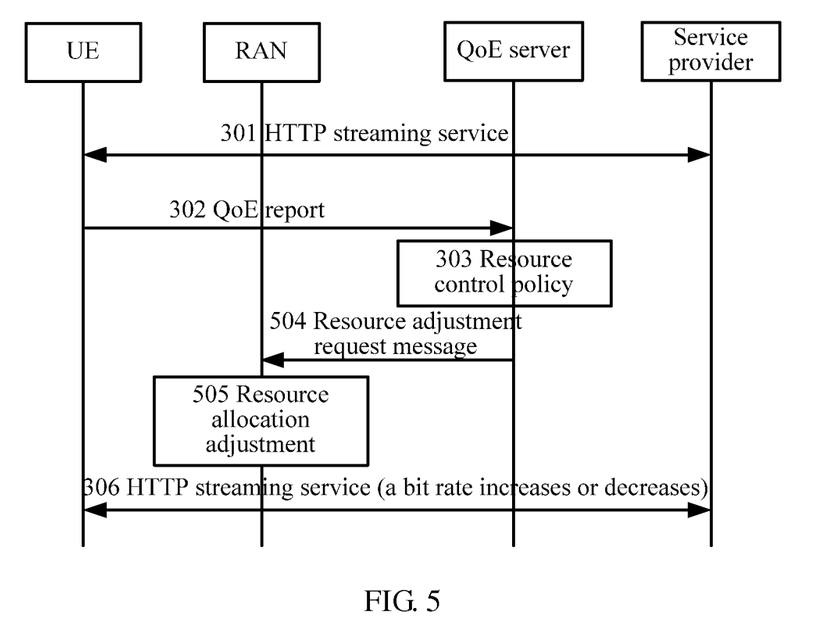
FIG. 5 is a schematic flowchart of a process of a policy control method according to another embodiment of the present invention.

The following describes this embodiment of the present invention in detail with reference to a specific example. In FIG. 3 to FIG. 5, an HTTP streaming service is used as an example. It should be understood that, this is not construed as a limitation on this embodiment of the present invention. In addition to the HTTP streaming service, another service type may also be acceptable. It should be noted that, in FIG. 3 to FIG. 5, an example in which the QoE server performs, by using the resource control policy for the serving cell, policy control according to the QoE report is used for description. It should further be understood that this embodiment of the present invention sets no limitation on a policy form that is determined according to the QoE report by the QoE server. The policy may be the cell policy for the hotspot cell, the cell policy for the service fault cell, or the like.

FIG. 3 is a schematic flowchart of a process of a policy control method according to an embodiment of the present invention.

301. A service provider provides an HTTP streaming service for a UE.

302. The UE sends a QoE report to a QoE server.

The QoE report includes a QoE metric and a cell identity of a serving cell of the UE. For example, the QoE metric may be an average throughput, a buffer level, a playlist, an initial playback delay, a media presentation handover implementation list, MPD information, an HTTP request/response interaction list, or the like.

For example, an XML (Extensible Markup Language, Extensible Markup Language) of the cell identity in the QoE report may be expressed as follows:

```
<xs:complexType name="CellIDType">
  <xs:choice>
    <xs:element name="CellID Entry" type="CellIDEntryType" maxOccurs="unbounded"/>
  </xs:choice>
  <xs:anyAttribute processContents="skip"/>
</xs:complexType>
<xs:complexType name="CellIDEntryType">
  <xs:attribute name="t" type="xs:dateTime" use="required"/>
  <xs:attribute name="id" type="xs:unsignedInt" use="required"/>
  <xs:anyAttribute processContents="skip"/>
</xs:complexType>
```

The UE may report the QoE report in an HTTP submission manner, and the QoE metric and the cell identity may be appended, in an XML format, to a message body submitted by the HTTP. Information related to the cell identity may be added to the message body submitted by the HTTP, and the information is as follows:

```
<CellID>
  <CellIDEntry t="2012-03-16T09:08:19" id="12345678"/>
<\CellID>
```

In this example, a cell identity of the serving cell of the UE is "12345678", and time that the UE gains access to the HTTP streaming service is "09:08:19, Mar. 16, 2012".

It should be understood that the foregoing example is merely exemplary but sets no limitation on this embodiment of the present invention.

303. The QoE server determines a resource control policy for a serving cell according to the QoE report.

For example, after receiving the QoE report in step 302, the QoE server finds that multiple UEs in a same cell are gaining access to an HTTP streaming video service, and that resources cannot be fairly shared by the multiple UEs because of a time difference in gaining access to the HTTP streaming video service by the UEs. Therefore, the QoE server may determine a resource control policy for the cell according to the QoE report.

304. The QoE server sends a resource adjustment request message to the UE.

For example, the QoE server sends a resource adjustment request message for decreasing a bit rate to a UE that uses relatively many resources, or the QoE server sends a resource adjustment request message for increasing a bit rate to a UE that uses relatively few resources.

A manner in which the QoE server sends the resource adjustment request message to the UE may be implemented by using an application layer. For example, the resource adjustment request message may be carried by a new extension header field in the HTTP protocol or some reusable header fields (for example, a warning header field) in the HTTP protocol. Specifically, the QoE server may specially send the resource adjustment request message to the UE or insert the Warning header field into an HTTP response message that the service provider replies to the UE. It should be understood that this embodiment of the present invention sets no limitation on the manner in which the QoE server sends the resource adjustment request message to the UE.

305. The UE performs a resource allocation adjustment.

306. A bit rate in the HTTP streaming service increases or decreases.

For example, the UE may correspondingly increase the bit rate or decrease the bit rate according to the resource adjustment request message received in step 304. In this way, network resources can be effectively adjusted, thereby optimizing allocation of shared network resources and enhancing user experience.

FIG. 4 is a schematic flowchart of a process of a policy control method according to another embodiment of the present invention.

In the schematic flowchart shown in FIG. 4, for steps that are the same as or similar to those in FIG. 3, identical reference numerals are used, and to avoid repetition, details are not described herein again.

404. The QoE server performs a resource allocation adjustment.

For example, the QoE server is on a RAN side, and is located, together with a base station, in a same functional entity. In this case, the QoE server performs a resource allocation adjustment according to the resource control policy that is for the serving cell and determined in step 303. Specifically, the QoE server may adjust network resource allocation provided for a service. For example, the QoE server correspondingly increases or decreases a bit rate. In this way, network resources can be effectively adjusted, thereby optimizing allocation of shared network resources and enhancing user experience.

FIG. 5 is a schematic flowchart of a process of a policy control method according to another embodiment of the present invention.

In the schematic flowchart shown in FIG. 5, for steps that are the same as or similar to those in FIG. 3, identical references numeral are used, and to avoid repetition, details are not described herein again.

504. The QoE server sends a resource adjustment request message to a RAN.

505. The RAN performs a resource allocation adjustment.

For example, the QoE server may send the resource adjustment request message to a base station of the serving cell according to the resource control policy that is for the serving cell and determined in step 303. The base station may perform a resource allocation adjustment according to the resource adjustment request message received in step 504. Further, the resource adjustment request message may carry a service flow identifier. The base station may perform a resource allocation adjustment to a corresponding service according to the resource adjustment request message that carries the service flow identifier. For example, the base station correspondingly increases or decreases a bit rate. In this way, network resources can be effectively adjusted, thereby optimizing allocation of shared network resources, improving a network throughput, and enhancing user experience.

Figure 6:
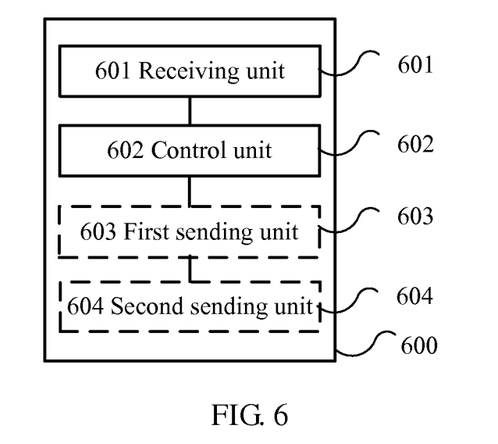
FIG. 6 is a structural block diagram of a QoE server according to an embodiment of the present invention.

FIG. 6 is a structural block diagram of a QoE server according to an embodiment of the present invention. A QoE server 600 in FIG. 6 includes a receiving unit 601 and a control unit 602.

The receiving unit 601 is configured to receive a quality of experience QoE report sent by a user equipment UE, where the QoE report includes a QoE metric and a cell identity of a serving cell of the UE.

The control unit 602 is configured to perform cell policy control according to the QoE report received by the receiving unit 601.

In this embodiment of the present invention, a QoE server receives a QoE report sent by a UE, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

The QoE server 600 may implement steps related to the QoE servers in the methods of FIG. 1 to FIG. 5, and to avoid repetition, details are not described herein again.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the control unit 602 is specifically configured to determine a resource control policy for the serving cell according to the QoE report.

Optionally, in another embodiment, the QoE server 600 may further include a first sending unit 603, configured to send a first resource adjustment request message to the UE according to the resource control policy, so that the UE correspondingly increases or decreases a bit rate according to the first resource adjustment request message; or the control unit 602 is further configured to perform a resource allocation adjustment according to the resource control policy; or the QoE server 600 may further include a second sending unit 604, configured to send a second resource adjustment request message to a RAN according to the resource control policy, so that the RAN performs a resource allocation adjustment according to the second resource adjustment request message. Further, the second resource adjustment request message carries a service flow identifier, so that the RAN performs a resource allocation adjustment to a corresponding service according to the second resource adjustment request message. In this way, network resources can be effectively adjusted, thereby improving network resource utilization.

It should be understood that this is not construed as a limitation on this embodiment of the present invention, that is, any manner in which the QoE server performs a resource control policy shall fall within the scope of the present invention.

Optionally, in another embodiment, the control unit 602 is specifically configured to determine a hotspot cell according to the QoE report, and determine a cell policy for the hotspot cell. Specifically, the cell policy for the hotspot cell may be a multipoint transmission policy of the hotspot cell. In this way, service offloading can be implemented in the hotspot cell, so that a network throughput increases, thereby enhancing user experience.

Optionally, in another embodiment, the control unit 602 is specifically configured to determine a congested cell according to the QoE report, and determine a cell policy for the congested cell. Specifically, the cell policy for the congested cell may be a cell handover policy of the congested cell. In this way, it can be ensured that a user service of the congested cell is not interrupted, thereby enhancing user experience.

Optionally, in another embodiment, the control unit 602 is specifically configured to determine a service fault cell according to the QoE report, and determine a cell policy for the service fault cell. Specifically, the cell policy for the service fault cell may be a service recovery policy of the service fault cell. In this way, a problem of a service fault can be solved promptly, thereby enhancing user experience.

It should be understood that this embodiment of the present invention sets no limitation on a policy form that is determined according to the QoE report by the QoE server.

Figure 7:
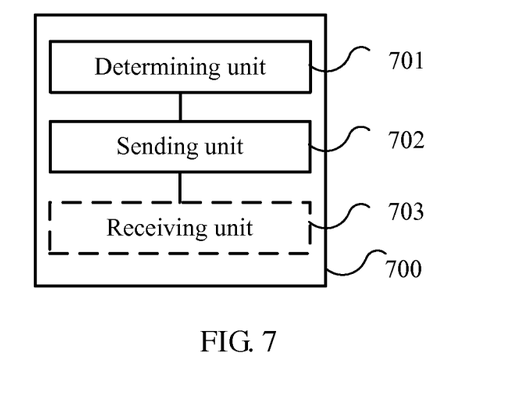
FIG. 7 is a structural block diagram of a user equipment according to another embodiment of the present invention.

FIG. 7 is a structural block diagram of a user equipment according to another embodiment of the present invention. A user equipment 700 in FIG. 7 includes a determining unit 701 and a sending unit 702.

The determining unit 701 is configured to determine a quality of experience QoE report.

The sending unit 702 is configured to send the QoE report, which is determined by the determining unit 701, to a QoE server, where the QoE report includes a QoE metric and a cell identity of a serving cell of the user equipment UE, so that the QoE server performs cell policy control according to the QoE report.

In this embodiment of the present invention, a UE sends a QoE report to a QoE server, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

The user equipment 700 may implement steps related to the user equipments in the methods of FIG. 1 to FIG. 5, and to avoid repetition, details are not described herein again.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the user equipment 700 may further include: a receiving unit 703, configured to receive a first resource adjustment request message that is sent according to the resource control policy by the QoE server. The determining unit 701 is further configured to correspondingly increase or decrease a bit rate according to the first resource adjustment request message. In this way, network resources can be effectively adjusted, thereby improving network resource utilization.

A communications system according to an embodiment of the present invention may include the foregoing QoE server 600 or the foregoing user equipment 700.

Figure 8:
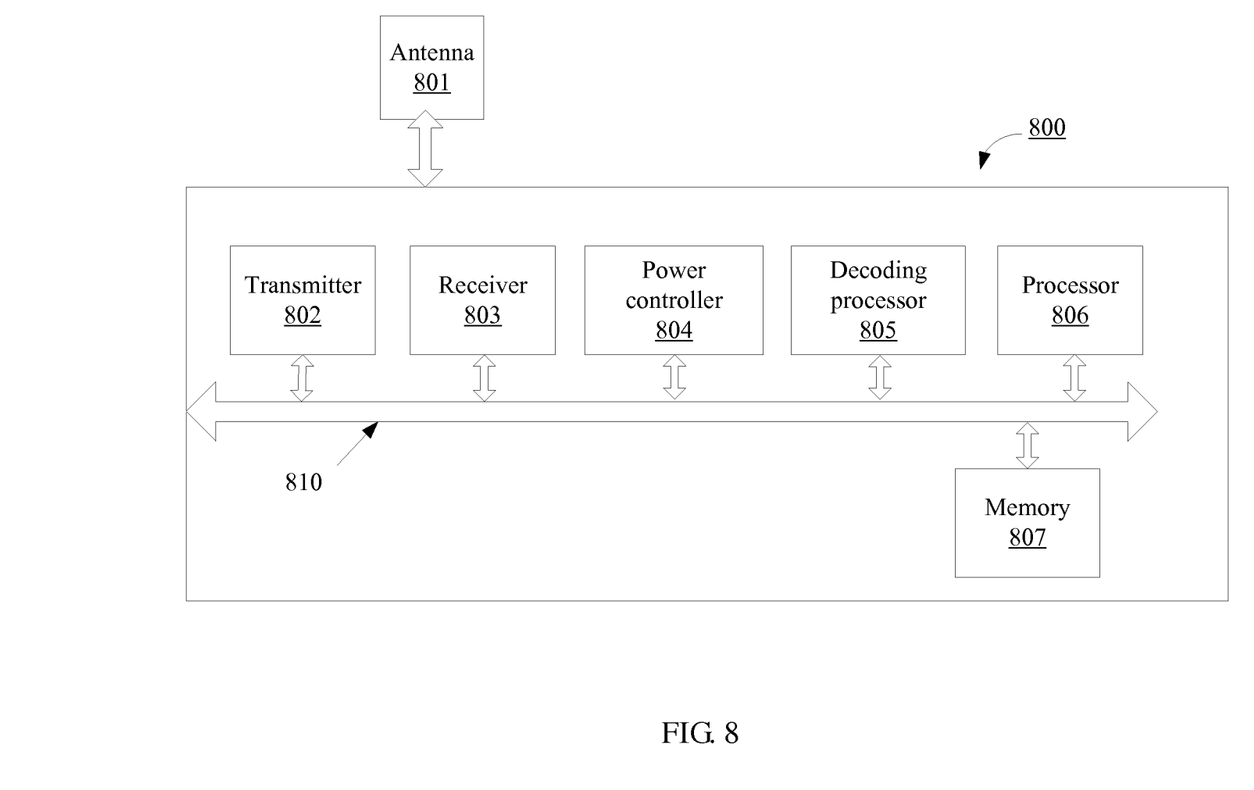
FIG. 8 is a block diagram of a device according to an embodiment of the present invention.

The embodiments of the present invention further provide apparatus embodiments for each step and method in the foregoing method embodiments. The embodiments of the present invention may be applied to a QoE server and a user equipment in various communications systems. FIG. 8 shows an embodiment of a device, and in this embodiment, a device 800 includes a transmitter 802, a receiver 803, a power controller 804, a decoding processor 805, a processor 806, a memory 807, and an antenna 801. The processor 806 controls an operation of the device 800, and the processor 806 may further be referred to as a central processing unit CPU or a processor. The memory 807 may include a read-only memory and a random access memory, and provides an instruction and data for the processor 806. A part of the memory 807 may further include a nonvolatile random access memory (NVRAM). In specific application, the device 800 may be built in or the device 800 itself may be a wireless communications device, such as a mobile phone, and the device 800 may further include a carrier that accommodates the transmitter 802 and the receiver 803, so as to allow data receiving and transmission between the device 800 and a remote location. The transmitter 802 and the receiver 803 may be coupled to the antenna 801. All components of the device 800 are coupled together by using a bus system 810, where in addition to a data bus, the bus system 810 further includes a power bus, a control bus, and a state signal bus. However, for clear description, various buses are marked as the bus system 810 in the figure. The device 800 may further include the processor 806 configured to process a signal, and in addition, the device 800 further includes a power controller 804 and the decoding processor 805.

The foregoing method disclosed in the embodiments of the present invention may be applied to the foregoing device 800, or implemented mainly by using the processor 806 and the transmitter 802 in the device 800. The processor 806 may be an integrated circuit chip and has a signal processing capability. During an implementation process, steps in the foregoing method may be completed by using an integrated logic circuit of hardware in the processor 806 or an instruction in a form of software. The foregoing decoding processor may be a general purpose processor, a digital signal processor (DSP), an application-specific integrated circuit (ASIC), a field programmable gate array (FPGA) or another programmable logic component, a discrete gate or a transistor logic device, or a discrete hardware assembly, configured to execute the method disclosed in the embodiments of the present invention. The methods, the steps, and the logical block diagrams disclosed in the embodiments of the present invention may be implemented or executed. The general purpose processor may be a microprocessor or the processor may also be any conventional processor, decoder, or the like. Steps of the methods disclosed in the embodiments of the present invention may be directly executed by a hardware decoding processor, or may be executed by using a combination of hardware and a software module in the decoding processor. The software module may be located in a mature storage medium in the field, such as a random access memory, a flash memory, a read-only memory, a programmable read-only memory, an electrically erasable programmable memory, or a register. The storage medium is located in the memory 807, and a decoding unit reads information in the memory 807 and completes the steps in the foregoing methods in combination with hardware of the decoding unit.

Figure 9:
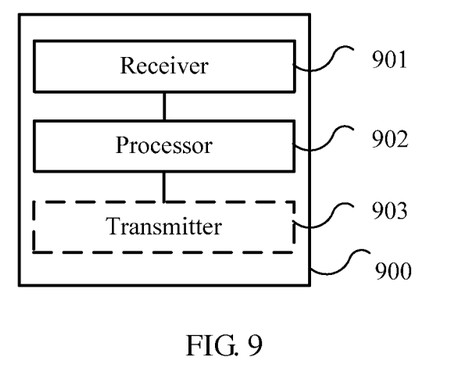
FIG. 9 is a structural block diagram of a QoE server according to an embodiment of the present invention.

Further, FIG. 9 is a structural block diagram of a QoE server according to an embodiment of the present invention. A QoE server 900 in FIG. 9 includes a receiver 901 and a processor 902.

The receiver 901 is configured to receive a quality of experience QoE report sent by a user equipment UE, where the QoE report includes a QoE metric and a cell identity of a serving cell of the UE.

The processor 902 is configured to perform cell policy control according to the QoE report received by the receiver 901.

In this embodiment of the present invention, a QoE server receives a QoE report sent by a UE, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

The QoE server 900 may implement steps related to the QoE servers in the methods of FIG. 1 to FIG. 5, and to avoid repetition, details are not described herein again.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the processor 902 is specifically configured to determine a resource control policy for the serving cell according to the QoE report.

Optionally, in another embodiment, the QoE server 900 may further include a transmitter 903, configured to send a first resource adjustment request message to the UE according to the resource control policy, so that the UE correspondingly increases or decreases a bit rate according to the first resource adjustment request message; or the processor 902 is further configured to perform a resource allocation adjustment according to the resource control policy; or the transmitter 903 is configured to send a second resource adjustment request message to a RAN according to the resource control policy, so that the RAN performs a resource allocation adjustment according to the second resource adjustment request message. Further, the second resource adjustment request message carries a service flow identifier, so that the RAN performs a resource allocation adjustment to a corresponding service according to the second resource adjustment request message. In this way, network resources can be effectively adjusted, thereby improving network resource utilization.

It should be understood that, this is not construed as a limitation on this embodiment of the present invention, that is, any manner in which the QoE server performs a resource control policy shall fall within the scope of the present invention.

Optionally, in another embodiment, the processor 902 is specifically configured to determine a hotspot cell according to the QoE report, and determine a cell policy for the hotspot cell. Specifically, the cell policy for the hotspot cell may be a multipoint transmission policy of the hotspot cell. In this way, service offloading can be implemented in the hotspot cell, so that a network throughput increases, thereby enhancing user experience.

Optionally, in another embodiment, the processor 902 is specifically configured to determine a congested cell according to the QoE report, and determine a cell policy for the congested cell. Specifically, the cell policy for the congested cell may be a cell handover policy of the congested cell.

Optionally, in another embodiment, the processor 902 is specifically configured to determine a service fault cell according to the QoE report, and determine a cell policy for the service fault cell. Specifically, the cell policy for the service fault cell may be a service recovery policy of the service fault cell. In this way, a problem of a service fault can be solved promptly, thereby enhancing user experience.

It should be understood that this embodiment of the present invention sets no limitation on a policy form that is determined according to the QoE report by the QoE server.

Figure 10:
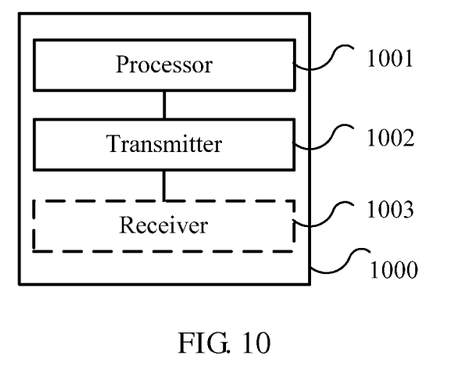
FIG. 10 is a structural block diagram of a user equipment according to another embodiment of the present invention.

FIG. 10 is a structural block diagram of a user equipment according to another embodiment of the present invention. A user equipment 1000 in FIG. 10 includes a processor 1001 and a transmitter 1002.

The processor 1001 is configured to determine a quality of experience QoE report.

The transmitter 1002 is configured to send the QoE report, which is determined by the processor 1001, to a QoE server, where the QoE report includes a QoE metric and a cell identity of a serving cell of the user equipment UE, so that the QoE server performs cell policy control according to the QoE report.

In this embodiment of the present invention, a UE sends a QoE report to a QoE server, where the QoE report not only includes a QoE metric, but also includes a cell identity of a serving cell of the UE. Therefore, the QoE server performs policy control within a cell range according to the QoE report, thereby effectively improving flexibility of QoE service deployment and enhancing user experience.

The user equipment 1000 may implement steps related to the user equipments in the methods of FIG. 1 to FIG. 5, and to avoid repetition, details are not described herein again.

Optionally, in an embodiment, the QoE metric may be an average throughput, a buffer level, a playlist, an initial playback delay, a media presentation handover implementation list, an HTTP request/response interaction list, or the like. The QoE metric may further be, for example, signal strength that is collected at a physical layer and reflects channel transmission quality. It should be understood that, this is not construed as a limitation on this embodiment of the present invention.

Optionally, in another embodiment, the user equipment 1000 may further include: a receiver 1003, configured to receive a first resource adjustment request message that is sent according to the resource control policy by the QoE server. The processor 1001 is further configured to correspondingly increase or decrease a bit rate according to the first resource adjustment request message. In this way, network resources can be effectively adjusted, thereby improving network resource utilization.

A communications system according to an embodiment of the present invention may include the foregoing QoE server 900 or the foregoing user equipment 1000.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A policy control method, comprising:
   receiving a quality of experience (QoE) report sent by a user equipment (UE) using a Hypertext Transfer Protocol (HTTP) submission, wherein the QoE report comprises a QoE metric, an access time at which the UE gains access to an HI IP streaming service, and a cell identity of a serving cell of the UE, and wherein the cell identity is appended, in an Extensible Markup Language (XML) format, to the HTTP submission; and
   performing cell policy control according to the QoE report by a QoE server in response to the QoE server determining that multiple UEs in a same cell, including the UE that sends the QoE report, gain access to the HTTP streaming service and cannot fairly share resources because of a time difference in gaining access to the HI IP streaming service, the performing the cell policy control comprising sending, by the QoE server, a resource adjustment request to a target that is the UE or a radio access network (RAN), wherein the resource adjustment request causes the target to adjust a communication parameter for a transmission associated with the QoE report, wherein the resource adjustment request that is sent to the UE is sent using an application layer;
   wherein the QoE metric is at least one of an average throughput, a playlist, an initial playback delay, a media presentation handover implementation list, and an HTTP request/response interaction list.

2. The method according to claim 1, wherein the performing the cell policy control according to the QoE report comprises:
   determining a resource control policy for the serving cell according to the QoE report.

3. The method according to claim 2, wherein the performing cell policy control according to the QoE report comprises:
   performing, after the determining the resource control policy:
      sending the resource adjustment request as a first resource adjustment request message to the UE according to the resource control policy, the first resource adjustment request message causing the UE to correspondingly increase or decrease a bit rate according to the first resource adjustment request message; or
      sending the resource adjustment request as a second resource adjustment request message to the radio access network RAN according to the resource control policy, the second resource adjustment request message causing the RAN to perform a resource allocation adjustment according to the second resource adjustment request message.

4. The method according to claim 3, wherein the second resource adjustment request message carries a service flow identifier, so that the RAN performs a resource allocation adjustment to a corresponding service according to the second resource adjustment request message.

5. The method according to claim 1, wherein the performing the cell policy control according to the QoE report comprises:
   determining a service fault cell according to the QoE report; and
   determining a cell policy for the service fault cell.

6. The method according to claim 5, wherein the cell policy for the service fault cell comprises a service recovery policy of the service fault cell.

7. The method according to claim 1, wherein the performing the cell policy control according to the QoE report comprises:
   determining a congested cell according to the QoE report, and determining a cell policy for the congested cell.

8. The method according to claim 7, wherein the cell policy for the congested cell comprises a cell handover policy of the congested cell.

9. The method according to claim 1, wherein the method further comprises:
   wherein the resource adjustment request that is sent to the UE is sent in a HTTPresponse message header field.

10. The method according to claim 9, wherein the resource adjustment request that is sent to the UE is sent in a warning header field of a HTTP response message.

11. A quality of experience (QoE) server, comprising:
    a processor;
    a non-transitory computer readable medium connected to the processor and having stored thereon instructions for causing the causing the processor to:
       receive a quality of experience (QoE) report sent by a user equipment (UE) using a Hypertext Transfer Protocol (HTTP) submission, wherein the QoE report comprises a QoE metric, an access time at which the UE gains access to an HTTP streaming service, and a cell identity of a serving cell of the UE, and wherein the cell identity is appended, in an Extensible Markup Language (XML) format, to the HTTP submission; and perform cell policy control according to the QoE report in response to the QoE server determining that multiple UEs in a same cell, including the UE that sends the QoE report, gain access to the HTTP streaming service and cannot fairly share resources because of a time difference in gaining access to the HTTP streaming service, wherein the instructions for causing the processor to perform the cell policy control comprise instructions for sending, by the QoE server, a resource adjustment request to a target that is the UE or a radio access network (RAN), wherein the resource adjustment request causes the target to adjust a communication parameter for a transmission associated with the QoE report, wherein the resource adjustment request that is sent to the UE is sent using an application layer;

wherein the QoE metric is at least one of an average throughput, a playlist, an initial playback delay, a media presentation handover implementation list, and an HTTP request/response interaction list.

12. The QoE server according to claim 11, wherein the non-transitory computer readable medium further has stored thereon instructions for causing the causing the processor to:
determine a resource control policy for the serving cell according to the QoE report.

13. The QoE server according to claim 12, wherein the non-transitory computer readable medium further has stored thereon instructions for causing the causing the processor to perform:
sending the resource adjustment request as a first resource adjustment request message to the UE according to the resource control policy, the first resource adjustment request message causing the UE to correspondingly increase or decrease a bit rate according to the first resource adjustment request message; or
sending the resource adjustment request as a second resource adjustment request message to the radio access network RAN according to the resource control policy, the second resource adjustment request message causing the RAN to perform a resource allocation adjustment according to the second resource adjustment request message.

14. The QoE server according to claim 13, wherein the second resource adjustment request message carries a service flow identifier, so that the RAN performs a resource allocation adjustment to a corresponding service according to the second resource adjustment request message.

15. The QoE server according to claim 11, wherein the non-transitory computer readable medium further has stored thereon instructions for causing the causing the processor to:
determine a service fault cell according to the QoE report; and
determine a cell policy for the service fault cell.

16. The QoE server according to claim 11, wherein the non-transitory computer readable medium further has stored thereon instructions for causing the causing the processor to:
determine a congested cell according to the QoE report; and
determine a cell policy for the congested cell.

17. The QoE server according to claim 11, wherein the resource adjustment request that is sent by the QoE server is sent in an HTTP response message header field.

18. A user equipment, comprising:
a processor;
a non-transitory computer readable medium connected to the processor and having stored thereon instructions for causing the causing the processor to:
determine a quality of experience (QoE) report; and
send the QoE report to a QoE server using a Hypertext Transfer Protocol (HTTP) submission, so that the QoE server performs cell policy control according to the QoE report in response to the QoE server determining that multiple UEs in a same cell, including the UE, gain access to an HTTP streaming service and cannot fairly share resources because of a time difference in gaining access to the HI IP streaming service, wherein the QoE report comprises a QoE metric, the access time at which the UE gains access to the HTTP streaming service, and a cell identity of a serving cell of the user equipment (UE), and wherein the cell identity is appended, in an Extensible Markup Language (XML) format, to the HTTP submission;
receive a first resource adjustment request message that is sent by the QoE server using an application layer according to a resource control policy, wherein the resource control policy is determined by the QoE server for the serving cell according to the QoE report
wherein the QoE metric is at least one of an average throughput, a playlist, an initial playback delay, a media presentation handover implementation list, and an HTTP request/response interaction list.

19. The user equipment according to claim 18, wherein the non-transitory computer readable medium further has stored thereon instructions for causing the causing the processor to:
increase or decrease a bit rate according to the first resource adjustment request message.

20. The user equipment according to claim 18, wherein the first resource adjustment request message that is sent by the QoE server is sent in an HTTP response message header field.

* * * * *

UNITED STATES PATENT AND TRADEMARK OFFICE
CERTIFICATE OF CORRECTION

PATENT NO. : 9,930,675 B2  
APPLICATION NO. : 14/602931  
DATED : March 27, 2018  
INVENTOR(S) : Anni Wei et al.

Page 1 of 1

It is certified that error appears in the above-identified patent and that said Letters Patent is hereby corrected as shown below:

In the Claims

Column 15, Line 45, Claim 1, delete "HI IP" and insert --HTTP--.

Column 15, Line 55, Claim 1, delete "HI IP" and insert --HTTP--.

Column 18, Line 24, Claim 18, delete "HI IP" and insert --HTTP--.

Signed and Sealed this  
Ninth Day of October, 2018

Andrei Iancu  
*Director of the United States Patent and Trademark Office*